(No Model.)
G. E. SUTPHEN.
HAMMOCK SPREADER.
No. 416,242. Patented Dec. 3, 1889.
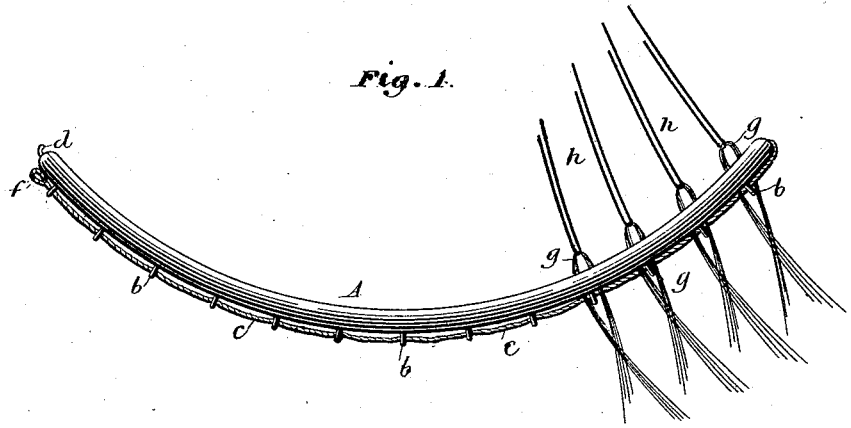
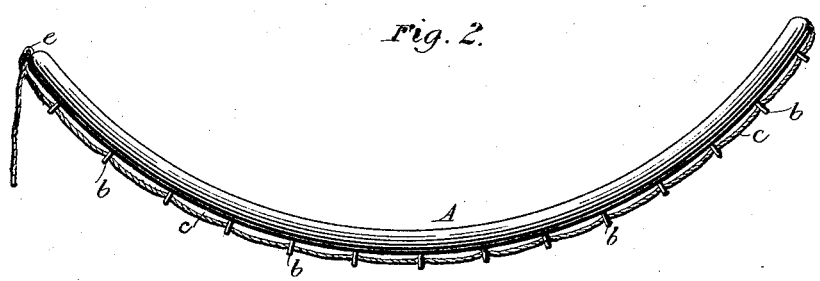
Witnesses
Will S. Norton
H. S. Rohrer
Inventor
George E. Sutphen
By his Attorneys
John J. Halsted & Son

UNITED STATES PATENT OFFICE.

GEORGE E. SUTPHEN, OF AURORA, ILLINOIS.

HAMMOCK-SPREADER.

SPECIFICATION forming part of Letters Patent No. 416,242, dated December 3, 1889.

Application filed May 16, 1889. Serial No. 310,978. (No model.)

*To all whom it may concern:*

Be it known that I, GEORGE E. SUTPHEN, of Aurora, in the county of Kane and State of Illinois, have invented certain new and useful Improvements in Hammock-Spreaders; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates more particularly to the structure of a detachable spreader and its means for readily securing it to or releasing it from the end loops of the hammock.

The invention will clearly appear from the following, in connection with the drawings, in which—

Figure 1 shows a sufficient portion of a hammock with my improved spreader applied thereto to illustrate fully the advantages of the spreader and the manner in which the same is readily and removably connected with the end loops. Fig. 2 shows one of my improved spreaders detached, differing from that shown in Fig. 1 only in the means for fastening the free end of its cord after the spreader and its interlacing-cord have been applied to the hammock.

A is the spreader or stretcher, solid and in a single piece.

$b\ b$ are staples or screw-eyes fixed at regular or proper intervals in the stretcher-bar, and having these eyes located transversely to the length of the bar, as shown, so that a cord passing through all such eyes shall be continuously in line with the bar. This cord $c$ is permanently fastened to one end of the spreader, and at the other end I place either a hook $d$, as shown in Fig. 1, or a staple or eye $e$, as shown in Fig. 2. For use with the hook I make a loop $f$ in the end of the cord, and the elasticity of a proper cord—say a cotton one—permits the making of it a little short or taut, so that a slight stretching allows the loop to be engaged with the hook, and thus not leave the cord unduly slack.

The end loops of a hammock are some of them shown sufficiently at $g$, and the converging cords by which the hammock may be suspended for use are some of them shown at $h$.

In applying this spreader to, say, the upper side of a hammock having end loops, the staples or eyes $b$ are each severally placed within one of the hammock-loops $g$, and the cord $c$ is passed, as clearly shown, under the loop and through the eye projecting into such end loop, and so on continuously for each eye and each end loop until the hammock and cord are interlaced together. The end of the cord is then, by means of its loop $f$, hung on the hook $d$, and the spreader is thus firmly applied. As before stated, a mere eye or staple $e$ may be used in the end of the spreader instead of the hook $d$. (See Fig. 2.) In such case, if desired, the loop $f$ at the end of the cord may be dispensed with and the end of the cord left free and to be tied or fastened in any way to the eye. It will now be seen that these means and this manner of connecting the spreader to the hammock have many advantages in addition to that of being readily removable from the hammock, or as readily again applied, without trouble and by any child, among which may be named the following: The staples $b$ serve to space and keep the hammock-loops apart and equidistant from each other, and they consequently cannot slip along the spreader from the positions assigned to them. The cord, in conjunction with the staples, positively effects this desired result, and not only interlaces itself (after the manner of weaving) with the hammock, but it also interlocks both itself and the hammock with the stretcher, so that all three are so interlocked that neither part can unduly shift its position relatively to the other parts, and yet by the mere unfastening of the cord from the hook $d$ or eye $e$, as the case may be, the spreader may be readily detached from the end loops $g$ of the netted or other hammock.

It will be observed that the suspension-cords $h$ are in no wise directly connected to or interlaced or interlocked with either the spreader or with the cord $c$. It will also be noticed that the spreader is preserved in all its original strength and durability, not being weakened transversely or otherwise by any notches or grooves in which dirt or moisture can settle and promote decay. Such notches also, when used, are constantly catching in the cords and tend to tangle the hammock. The cord c, being flexible, is adapted for and adapts itself to the sinuous shape which may be required of it in passing under and over the threads of the several loops g of the hammock, which each of these loops g spans and receives one of the staples.

It will be evident that the staples or eyes b may, if desired, be put on the upper instead of on the under side of the curved spreader, or they may be put on both the under and upper sides.

I do not broadly claim a hammock-spreader provided with staples, and I am aware that a spreader having transverse slots to receive the suspension-cords on which a cloth hammock is hung, and having a rod to hold these cords in such slots, has been used before; but I have no such construction.

I claim—

1. The hammock-spreader described, made solid throughout and with a series of staples inserted therein transversely, as set forth, combined with a flexible cord permanently fastened to one of the ends of the spreader and adapted to be passed through such staples, the spreader being provided at its other end with a device for fastening thereto the unattached end of such cord.

2. In combination, a solid hammock-spreader devoid of notches or grooves and having the eyes or staples applied transversely thereto, as set forth, the flexible interlocking cord secured fixedly to one end of the spreader and adapted to be passed through such staples and having a loop at its free end, and a hook or holder d at the end of the spreader, all as shown and described.

3. In combination with a hammock having end loops g, adapted for connection with suspension-cords h, a spreader provided with a flexible lacing-cord c, attached to the end of the spreader, and also with transversely-placed eyes or staples b, as described, such cord being interlaced both with the loops and with the eyes b by passing over a part of the loop, then through an eye, and then under the other part of the same loop, all as shown and described.

GEO. E. SUTPHEN.

Witnesses:
RUSSELL P. GOODWIN,
F. D. WINSLOW.